(12) United States Patent
Deffenbaugh et al.

(10) Patent No.: US 7,433,784 B2
(45) Date of Patent: Oct. 7, 2008

(54) METHOD TO DETERMINE PROPERTIES OF A SEDIMENTARY BODY FROM THICKNESS AND GRAIN SIZE DISTRIBUTION AT A POINT WITHIN THE BODY

(75) Inventors: Max Deffenbaugh, Annandale, NJ (US);
David C. Hoyal, Houston, TX (US);
Neal L. Adair, Sugar Land, TX (US);
Chun Huh, Austin, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 244 days.

(21) Appl. No.: 10/550,172

(22) PCT Filed: Mar. 18, 2004

(86) PCT No.: PCT/US2004/008238

§ 371 (c)(1),
(2), (4) Date: Jun. 28, 2006

(87) PCT Pub. No.: WO2004/093521

PCT Pub. Date: Nov. 4, 2004

(65) Prior Publication Data

US 2006/0265131 A1    Nov. 23, 2006

(51) Int. Cl.
*G06F 19/00* (2006.01)
(52) U.S. Cl. .................................................. 702/2
(58) Field of Classification Search ............... 702/1–14
See application file for complete search history.

(56) References Cited

U.S. PATENT DOCUMENTS 3,268,858 A * 8/1966 Winter ..................... 367/25

4,821,242 A * 4/1989 Hennington .................. 367/53

(Continued)

FOREIGN PATENT DOCUMENTS

WO    WO2006031383    3/2006

(Continued)

OTHER PUBLICATIONS

Bradford, S. F. and Katopodes, N. D. (1999) "Hydrodynamics of Turbid Underflows. I: Formulation and Numerical Analysis" *Journ. Hydr. Eng.*, 125 (10), pp. 1006-1015.

(Continued)

*Primary Examiner*—Bryan Bui
*Assistant Examiner*—Jonathan Teixeira Moffat
(74) *Attorney, Agent, or Firm*—Matthew T. Shanley

(57) ABSTRACT

The properties of a water-lain sediment body are determined from a measurement of grain size distribution and deposit thickness at one location in the body is disclosed. The flow properties at the measured location are determined, the flow properties are extrapolated back to the inlet through which the depositing flow was emitted, at least one property of the water-lain sediment throughout the sediment body is determined by modeling the flow properties using the extrapolated flow properties at the inlet as a boundary condition. The flow properties associated with the sediment body include flow velocity, suspended sediment volume fractions, deposition time, and flow height. The properties of the water-lain sediments include, in addition to the flow properties associated with deposition of the sediments, the thickness of the sediment body, the size of the body, the shape of the body, and the grain size distribution at each point within the body.

14 Claims, 3 Drawing Sheets

U.S. PATENT DOCUMENTS

| | | | |
|---|---|---|---|
| 5,136,551 A | 8/1992 | Armitage | 367/38 |
| 5,563,513 A | 10/1996 | Tasci et al. | |
| 5,646,342 A | 7/1997 | Hagenes | 73/152.02 |
| 5,844,799 A | 12/1998 | Joseph et al. | 364/420 |
| 6,205,402 B1 | 3/2001 | Lazaar et al. | 702/2 |
| 6,246,963 B1 * | 6/2001 | Cross et al. | 702/14 |
| 6,674,689 B2 | 1/2004 | Dunn et al. | |
| 6,823,266 B2 | 11/2004 | Czernuszenko et al. | |
| 6,885,941 B2 | 4/2005 | Deffenbaugh et al. | |
| 7,024,021 B2 | 4/2006 | Dunn et al. | |
| 7,062,383 B2 | 6/2006 | Deffenbaugh et al. | |
| 7,369,980 B2 | 5/2008 | Deffenbaugh et al. | |
| 2004/0236511 A1 | 11/2004 | Deffenbaugh et al. | 702/2 |
| 2004/0260472 A1 | 12/2004 | Deffenbaugh et al. | 702/2 |
| 2006/0173622 A1 | 8/2006 | Deffenbaugh et al. | |
| 2007/0100593 A1 | 5/2007 | Deffenbaugh et al. | |
| 2007/0203677 A1 | 8/2007 | Awwiller et al. | |
| 2007/0219724 A1 | 9/2007 | Li et al. | |
| 2007/0219725 A1 | 9/2007 | Sun et al. | |

OTHER PUBLICATIONS

Dietrich, W. E. (1982) "Settling Velocity of Natural Particles", *J. Geophys. Research*, 18(6), pp. 1615-1626.

Garcia, M. and Parker, G. (1991) "Entrainment of Bed Sediment into Suspension", *Journ. Hydr. Eng.*, 117(4), pp. 414-435.

Huang, H. Q. Discussion: (1996) "Alluvial Channel Geometry: Theory and Applications" by Julien and Wargadalam. *Journ. Hydr. Eng.*, 122(12), pp. 750-751.

Huang, H. Q. and Nanson, G. C. (2000) "Hydraulic Geometry and Maximum Flow Efficiency as Products of the Principles of Least Action", *Earth Surf. Process. Landforms*, 25, pp. 1-16.

Imran, J. et al. (1998) "A Numerical Model of Channel Inception on Submarine Fans", *Journal Geophysical Research*, 103(C1), pp. 1219-1238.

Parker, G. et al. (1986) "Self-Accelerating Turbidity Currents" *Journ. Fluid Mech.*, 171, pp. 145-181.

Baines, P. G. (1995) *Topographic Effects in Stratified Flows*, New York: Cambridge University Press, considered 5 pages of book content list only.

Chaudry, M. H. (1993) *Open-Channel Flow*. Englewood Cliffs, NJ: Prentice-Hall.

Patankar (1980) *Numerical Heat Transfer and Fluid Flow*, McGraw-Hill, Hemisphere Publishing Corp., considered 4 pages of book content list only.

Baines, P. G. (1995) *Topographic Effects in Stratified Flows*, New York: Cambridge University Press, pp. 38-44 (index and table of contents).

Chaudry, M. H. (1993) *Open-Channel Flow*. Englewood Cliffs, NJ: Prentice-Hall, Second Edition, pp. 200, 248-254, 308-311, and 453-475 (index and table of contents).

Patankar (1980) *Numerical Heat Transfer and Fluid Flow*, McGraw-Hill, Hemisphere Publishing Corp, pp. 29-39, and 68-74 (index and table of contents).

Begin, Z. B. (1987) "Application of Diffusion-Erosion Model to Alluvial Channels Which Degrade Due to Base-Level Lowering", *Earth Surface Processes and Landforms*, vol. 13, pp. 487-500.

Bitzer, K. (1999) "Two-Dimensional Simulation of Clastic and Carbonate Sedimentation, Consolidation, Subsidence, Fluid Flow, Heat Flow and Solute Transport During the Formation of Sedimentary Basins", *Computers & Geosciences*, vol. 25, pp. 431-447.

Bradford, S. F. and Katopodes, N. D. (1999) "Hydrodynamics of Turbid Underflows. I: Formulation and Numerical Analysis", *J. Hydr. Eng.*, vol. 125, No. 10, pp. 1006-1015.

Dietrich, W. E. (1982) "Settling Velocity of Natural Particles", *J. Geophys. Res.*, vol. 18, No. 6, pp. 1615-1626.

Garcia, M. and Parker, G. (1991) "Entrainment of Bed Sediment into Suspension", *J. Hydr. Eng.*, vol. 117, No. 4, pp. 414-435.

Garcia, M. (1993) "Experiments on the Entrainment of Sediment Into Suspension by a Dense Bottom Current", *Jrnl. of Geophysical Research*, vol. 98, No. C3, Mar. 15, 1993, pp. 4793-4807.

Hager, W. H. (1996) "Alluvial Channel Geometry: Theory and Applications", *Jrnl. of Hydraulic Engineering*, Dec. 1996, pp. 750.

Huang, H. Q., and Nanson, G. C., (2000) "Hydraulic Geometry and Maximum Flow Efficiency as Products of the Principle of Least Action", *Earth Surf. Process. Landforms*, vol. 25, pp. 1-16.

Imran, J., Parker, G., and Katopodes, N. D. (1998) "A Numerical Model of Channel Inception on Submarine Fans", *J. Geophys. Res.*, vol. 103, No. C1, pp. 1219-1238.

Kenyon, P.M. and Turcotte, D. L. (1985) "Morphology of a Delta Prograding by Bulk Sediment Transport", *Geological Society of America Bullentin*, vol. 96, 14 figs., 2 tables, Nov. 1985, pp. 1457-1465.

Parker, G. Fukushima, Y. and Pantin, H. M. (1986) "Self-Accelerating Turbidity Currents", *J. Fluid Mech.*, vol. 171, pp. 145-181.

Rivenaes, J. C. (1992) "Application of a Dual-Lithology, Depth-Dependent Diffusion Equation in Stratigraphic Simulation", *Basin Research*, vol. 4, pp. 133.146.

\* cited by examiner

METHOD TO DETERMINE PROPERTIES OF A SEDIMENTARY BODY FROM THICKNESS AND GRAIN SIZE DISTRIBUTION AT A POINT WITHIN THE BODY

FIELD OF THE INVENTION

This invention relates generally to the field of geophysical prospecting. Specifically, the invention is a method for determining the size, shape, and grain size distribution of a sedimentary body from a measurement of its thickness and grain size distribution at one point.

BACKGROUND OF THE INVENTION

In the oil and gas industry, seismic prospecting techniques commonly are used to aid in the search for and evaluation of subterranean hydrocarbon deposits. A seismic prospecting operation consists of three separate stages: data acquisition, data processing, and data interpretation, and success of the operation depends on satisfactory completion of all three stages.

In the data acquisition stage, a seismic source is used to generate an acoustic signal that propagates into the earth and is at least partially reflected by subsurface seismic reflectors. The reflected signals are detected and recorded by an array of seismic receivers located at or near the surface of the earth, in an overlying body of water, or at known depths in boreholes.

During the data processing stage, the recorded seismic signals are refined and enhanced using a variety of procedures that depend on the nature of the geologic structure being investigated and on the characteristics of the raw data. In general, the purpose of the data processing stage is to produce an image of the subsurface from the recorded seismic data for use during the data interpretation stage.

The purpose of the data interpretation stage is to determine information about the subsurface geology of the earth from the processed seismic data. The results of the data interpretation stage may be used to determine the general geologic structure of a subsurface region, or to locate potential hydrocarbon reservoirs, or to guide the development of an already discovered reservoir.

At present, the conclusions that can be made after the data interpretation stage are generally limited to broad descriptions of the size, shape, and general nature of subsurface structures. These descriptions may, for example, provide an indication of the total volume of hydrocarbons, which might be retained in such structures. However, present technology does not allow the analyst to determine preferred locations within a structure for drilling wells, except in a very broad sense. In addition, when an exploration well has been drilled, present technology does not allow an analyst to be able to accurately characterize the nature of the subsurface structure in locations other than the immediate region surrounding the well.

As will be understood from this summary of the data interpretation stage of the seismic prospecting operation, it is desirable to be able to predict the broad nature of a subsurface structure of interest using only seismic data and a minimal number of exploration wells, preferably just one exploration well. Such a capability would facilitate estimation of hydrocarbon volume in place and production rates early in the hydrocarbon exploration and development process. As will be understood to those skilled in the art, the hydrocarbon volume and rate of production depend on a variety of factors, including the grain size distribution of the sand deposit that makes up the reservoir in which the hydrocarbons are found.

SUMMARY OF THE INVENTION

A method to determine the properties of a water-lain sediment body from a measurement of grain size distribution and deposit thickness at one location in the body is disclosed. In one embodiment, the method comprises (a) determining the flow properties at the measured location, (b) extrapolating the flow properties back to the inlet through which the depositing flow was emitted, (c) determining at least one property of the water-lain sediment throughout the sediment body by modeling the flow properties using the extrapolated flow properties at the inlet from step (b) as a boundary condition. The flow properties associated with the sediment body include flow velocity, suspended sediment volume fractions, deposition time, and flow height. The properties of the water-lain sediments include, in addition to the flow properties associated with deposition of the sediments, the thickness of the sediment body, the size of the body, the shape of the body, and the grain size distribution at each point within the body.

A second embodiment of the method to determine the properties of a water-lain sediment body from a measurement of grain size distribution and deposit thickness at one location in the body is also disclosed. The method comprises (a) estimating the flow height at the measured location, (b) determining the flow properties at the measured location from the grain size distribution and deposit thickness at the measured location, (c) extrapolating the flow properties and deposit properties along a characteristic curve intersecting the measurement point, (d) identifying the maximum extrapolated deposit thickness, (e) identifying the inlet point along the characteristic curve as the point where the flow properties are consistent with the inlet conditions, (f) repeating steps (a) through (e) until the maximum extrapolated deposit thickness is consistent with the flow properties at the identified inlet point, (g) predicting deposit properties throughout the whole sedimentary body by using the extrapolated flow properties at the identified inlet point as boundary conditions for a forward model.

DETAILED DESCRIPTION

Figure 1:
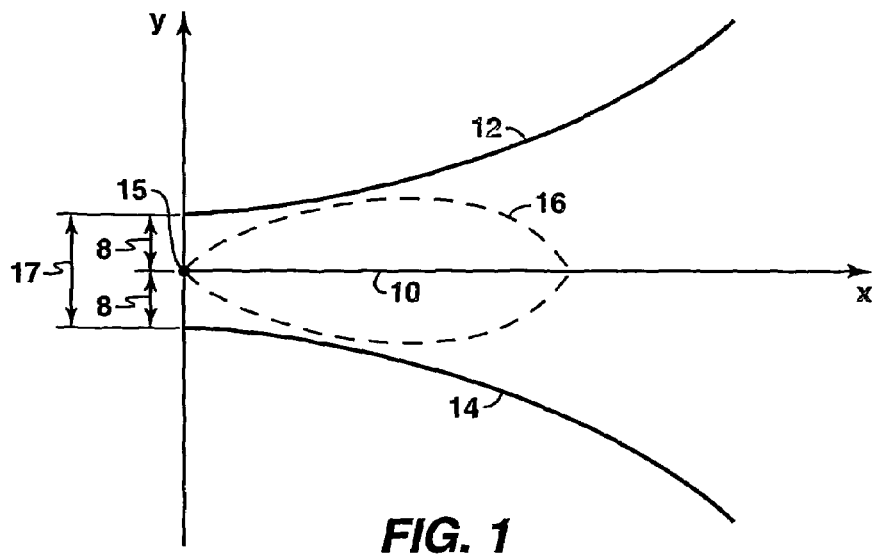
FIG. 1 is a plan view of a fluid flow which is depositing a sedimentary body, including the flow boundaries.

In the following detailed description, the invention will be described in connection with its preferred embodiment. However, to the extent that the following description is specific to a particular embodiment or a particular use of the invention, this is intended to be illustrative only. Accordingly, the invention is not limited to the specific embodiment described below, but rather, the invention includes all alternatives, modifications, and equivalents falling within the true scope of the appended claims.

The present invention is a method for predicting size, shape, and internal properties of a sediment deposit from a well penetration of the deposit at one location, without having to drill multiple wells. Specifically, the inventive method can be applied to finding the grain size distribution at every point within a water-lain sediment deposit as well as the shape and size of the deposit using a measurement at one point of the deposit thickness and grain size distribution.

As will be understood to those skilled in the art, the deposition of clastic sedimentary bodies typically begins with a flow of sediment-laden water from a confined channel, such as a river mouth, into an open region, such as a basin. The point where the sediment-laden flow enters an open region where deposition occurs is known as the inlet. Initially such flows expand freely and deposit sediment as the flow decelerates. Thereafter, as the deposited sediment grows in height, the deposited sediment begins to obstruct the flow field. Eventually, the deposit becomes sufficiently large that the flow is diverted around the deposit. This results in a new path and inlet for the flow field to an open region beyond or adjacent to the old deposit. The deposition process then repeats, and a second body in the system is created. In addition, more than one such body may be actively built within the system at a time. Overall, the process produces a deposit consisting of stacks of sedimentary bodies, which is a useful model for the structure of hydrocarbon reservoirs.

In the present inventive method, applicants recognized that since each body stops building when it is large enough to divert the flow, the scale of a body is related to the flow that builds it. Other properties of the body including its size, shape, and the internal properties, such as grain size distribution, are also controlled by the flow.

As will be understood by those skilled in the art, the flow characteristics which create such bodies can be analyzed from Navier-Stokes and continuity-based fluid flow principles applied to a sediment laden flow beneath stationary clear water that can be entrained, such as turbidity currents in the deep ocean. Such analyses can be extended to flows without vertical entrainment, such as a shallow water layer under air, and these extensions are also within the scope of the present invention.

Applicants recognized that applying reasonable assumptions to these principles facilitates an analysis procedure, which can be tied to a physical and empirical principle-based quantification of the characteristics of fluid flow-deposited sand bodies. This tie between fluid flow principles and sedimentary body deposit characteristics facilitates a method, which allows characterization of the overall properties of the deposit based on only a minimum amount of initially available data. That method, in its various embodiments, is the subject of the present invention.

The inventive method utilizes an assumption that the grains which compose the deposit are carried and deposited by a sediment-laden fluid flow with height $h(x,y)$, x-velocity $u(x,y)$, and y-velocity $v(x,y)$. The fluid flow contains a volume fraction $C_i(x,y)$ of grains of the ith grain size. The grains in the ith grain size bin all have a nominal characteristic diameter of $d_i$ and fall through still water with a terminal velocity (also referred to as a settling velocity) $v_{Si}$. Furthermore, the method is built on the assumption that the sediment, both in the flow and in the deposit, may be characterized by bins of a common nominal grain diameter. Each such bin may, for example, be characterized by a nominal diameter $d_i$, and include grains having an actual diameter which ranges from 84% to 119% of $d_i$. The time duration over which deposition persists to form the deposit is T, and the resulting deposit thickness is $z(x,y)$.

Figure 2:
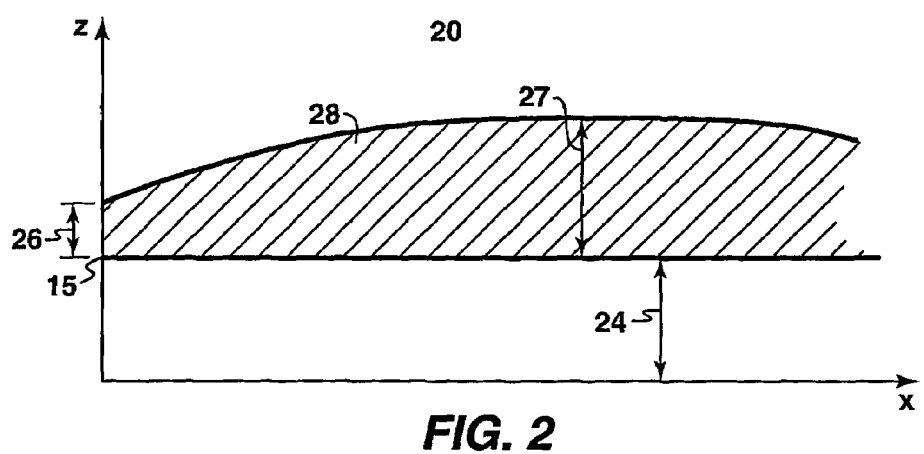
FIG. 2 is an elevation view corresponding to plan view FIG. 1.
Figure 3:
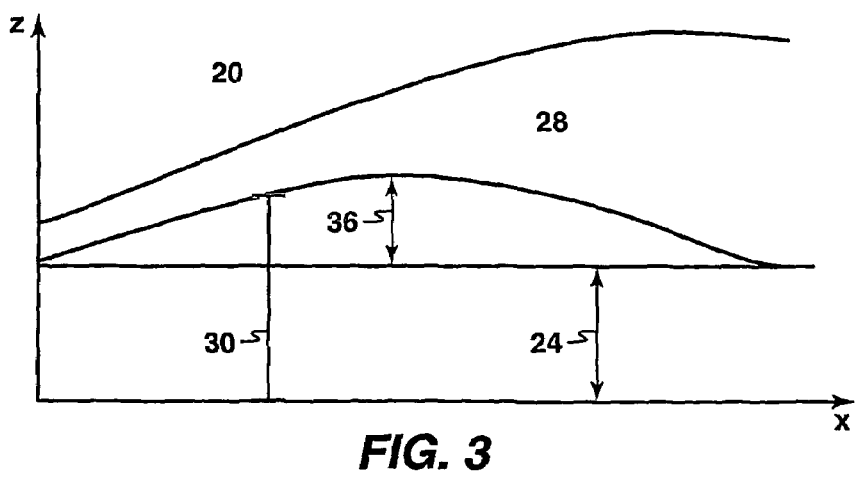
FIG. 3 is an elevation view corresponding to plan view FIG. 1 after deposition has occurred.

FIGS. 1, 2, and 3 depict the assumptions and parameters used in the present invention. FIG. 1 depicts a plan view of fluid flow 10 with flow boundaries 12 and 14. Inlet 15 for fluid flow 10 is centered, for convenience, at the origin of the x and y-axes, and flow emitted from the inlet moves initially in the positive x direction. At the inlet 15, the flow boundary has an initial width 17 and half-width 8 and expands in the positive x direction. Also depicted is an outline of the deposit 16 formed by the flow.

FIG. 2 depicts an elevation view corresponding to plan view FIG. 1. The fluid inside the flow boundaries 12 and 14 of FIG. 1 is comprised of two layers. FIG. 2 illustrates the two layers of fluid as a clear layer 20 above a sediment-laden layer 28. The sediment-laden layer 28 is also referred to herein as the turbid water layer. The elevation of the bottom topography before the deposition process occurs is 24. The height of the sediment-laden water layer at inlet 15 is 26. The height of the sediment-laden water layer 28 varies based on location, as evidenced by the fact that at a different point in FIG. 2, the sediment-laden water layer has a different height 27.

FIG. 3 is an elevation view corresponding to the plan view of FIG. 1 after deposition has occurred. As in FIG. 2, the fluid flow in FIG. 3 is depicted as being comprised of clear layer 20 above a turbid layer 28. The elevation of the subsurface topography after deposition is 30. This elevation consists of the elevation of the original bottom topography 24 in addition to the thickness of the newly deposited sediment layer 36.

Table 1 provides a detailed list of the parameters used in the present method. As is indicated in Table 1, the height $h_0$ and velocity $u_0$ of the turbid water flow at the inlet are assumed to be constant at the inlet, across the width of the inlet along the y-axis. The velocity $u_0$ is also constant vertically through the thickness of the flow. The inlet half-width b is also defined. Thereafter, based on the equations described herein, the height h and velocity components u and v of the turbid water layer are functions of position with respect to the x and y axes. Velocity components u and v are assumed to be constant over the depth of the turbid water layer. The turbid water layer is assumed to have a volume fraction $C_i$ of grains of the ith grain size averaged through the depth of the layer, but that volume fraction varies with x and y throughout the flow.

The deposit, which is formed from the flow of the turbid water layer, is assumed to be the result of the net deposition from the flow. The net deposition rate from the flow of grains of the ith grain size is the difference between the deposition rate $D_i$ of grains of the ith grain size from the flow onto the bottom and the erosion rate $E_i$ of grains of the ith grain size from the bottom back into the turbid water layer. The deposition process varies with the sediment concentration, and the erosion process varies with the flow velocity and deposit grain size distribution, so the net deposition will also vary with x and y locations. The net deposition process is assumed to be in steady-state; in other words the flow velocities, heights, and sediment volume fractions of the turbid water layer at each x and y location are constant throughout the deposition time T. The deposit which results is assumed to have a constant grain size distribution $G_i$ through the depth of the deposit, but that distribution can vary with x and y location throughout the deposit. The result of the deposition process after deposition time T is a deposit whose thickness z varies with x and y. It is assumed that deposition persists for deposition time T, and that the flow is uninfluenced by the growing body it deposits until time T. At time T, it is assumed that the body has reached a critical height, and the process of building the body is complete. Physically, this critical height is the height sufficient to divert the flow away from the body so that it is no longer building the body.

Figure 4:
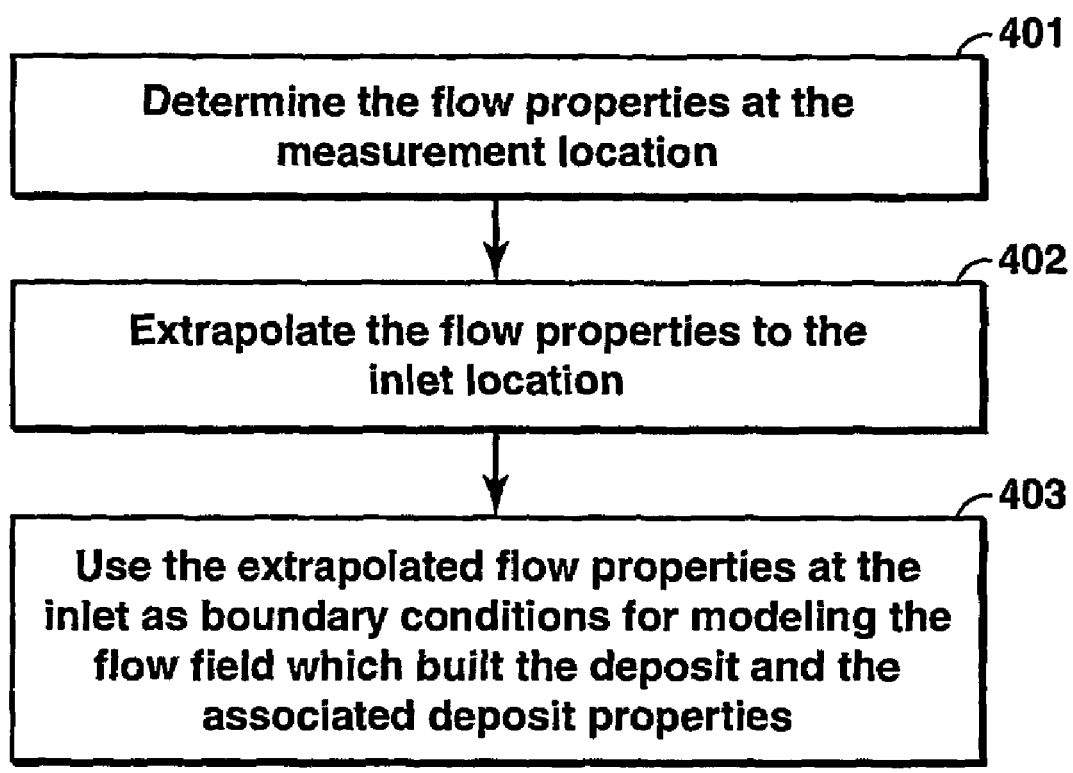
FIG. 4 is a flow chart of an embodiment of the invention.

A first embodiment will now be described. With reference to FIG. 4, this embodiment involves procedures to determine the flow properties at the inlet and to use the flow properties at the inlet as boundary conditions to model properties throughout a sedimentary body. The properties include the size and shape of the sedimentary body, the flow field that deposited the body, and the grain size distribution at any point within the sedimentary body. As illustrated in FIG. 4, the flow properties at the measurement location are determined (step 401). The flow properties determined in step 401 are extrapolated to the inlet location (step 402). Finally, the extrapolated flow properties at the inlet are used as boundary conditions for determining the internal properties of the body by modeling the flow field which built the deposit and the associated deposit properties (step 403). The individual steps will be described in greater detail in the following paragraphs.

First, the flow properties of the sedimentary body are determined. The thickness of the deposit and grain size distribution can be determined by well core data, seismic data or modeling of a sedimentary basin. In the present invention, both the thickness of the deposit z and the grain size distribution of the deposit $G_i$ are assumed to be a function of both the deposition $D_i$ and the erosion $E_i$ that occurs during the fluid flow process. More specifically:

Deposit Thickness:

$$z(x, y) = A(x, y, T) - A(x, y, 0) \quad [1]$$

$$= \frac{T}{1-\phi} \sum_i (D_i(x, y) - E_i(x, y))$$

Grain Size Distribution in Deposit:

$$G_i(x, y) = \frac{D_i(x, y) - E_i(x, y)}{\sum_i (D_i(x, y) - E_i(x, y))} \quad [2]$$

Now referring to FIG. 4, step 402, the flow properties are then extrapolated to the inlet location. The modeling of the depositing flow can be performed if the boundary conditions are known. An outflow boundary condition is applied along the edges of the simulation region, except for the y-axis as seen in FIG. 1. Along the y-axis, a u=0 boundary condition is applied except at the inlet, where the boundary conditions must be determined as in the inventive method. Those skilled in the art will recognize that other boundary conditions could be selected around the simulation region excluding the inlet, and other choices of non-inlet boundary conditions are within the scope of the invention.

Now referring to FIG. 1, step 403, the flow field is modeled using the flow properties at the inlet as a boundary condition. In this model of the fluid flow process, deposition is assumed to be a function of the following relatively simple relationship to the settling velocity $v_{Si}$ of the grains in still water:

Deposition Rate:

$$D_i(x, y) = \gamma_0 C_i(x, y) v_{Si} \quad [3]$$

where, for example, $v_{Si}$ may be calculated using the settling velocity equations published by Dietrich (1982). The factor $\gamma_0$ is the factor by which the sediment concentration at the bottom of the flow exceeds $C_i$, the vertically averaged sediment concentration in the flow. Typically, $\gamma_0=2$, though other choices of $\gamma_0$ are also within the scope of the invention.

It is generally understood that the erosion that occurs during the fluid flow process follows a complicated, empirically derived, relationship to the velocity of the flow. One such empirical erosion relationship is specified by Garcia and Parker, 1991:

Erosion Rate:

$$E_i = \min\left(\frac{\beta Z_i^5}{1+\beta Z_i^5/0.3} v_{si} G_i, D_i\right), \quad [4a]$$

where, $$Z_i = \lambda \frac{u^*}{v_{si}} R_{pi}^{0.6} \left(\frac{d_i}{p_{50}}\right)^{0.2}, \quad [4b]$$

$$R_{pi} = \frac{\sqrt{Rgd_i^3}}{v}. \quad [4c]$$

In these equations, the term, $$u^* = \sqrt{f(u^2+v^2)}, \quad [4d]$$

is a shear velocity which is a function of the magnitude of the local flow velocity and a drag coefficients f≈0.001-0.01 depending on the nature of the bottom. Typically, f=0.002. The grain size distribution is $G_i$, and the grain diameter associated with the 50th percentile of grain size in the deposit is $p_{50}$. The parameter $\beta=1.3\times10^{-7}$ and $\lambda=1-0.288\sigma_\phi$ where $\sigma_\phi$ is the standard deviation of the grain size distribution measured in the logarithmic "phi" units familiar to geologists.

The flow field at all points can be computed if the boundary conditions, particularly the flow conditions at the inlet, are known. The term "flow field" is used to mean the flow velocity parameters u(x,y) and v(x,y), as well as the height of the turbid water layer h(x,y) and sediment volume fractions $C_i$(x, y). The flow equations derive from the Navier-Stokes equations and continuity equations for a sediment laden flow beneath stationary clear water, and are important because the shape and internal properties of a deposited body depend on the flow field that deposited the body. For the motion of a turbid water layer, Parker, et al. (1986), Imran, et al. (1998), and Bradford and Katopodes (1999) all derived an appropriate system of equations. In a steady-state form, these equations can be written as follows:

X-Momentum:

$$\frac{\partial}{\partial x}(hu^2) + \frac{\partial}{\partial y}(huv) = -\frac{1}{2} Rg \frac{\partial C_T h^2}{\partial x} - c_D u\sqrt{u^2+v^2} \quad [5]$$

Y-Momentum:

$$\frac{\partial}{\partial x}(huv) + \frac{\partial}{\partial y}(hv^2) = -\frac{1}{2} Rg \frac{\partial C_T h^2}{\partial y} - c_D v\sqrt{u^2+v^2} \quad [6]$$

Sediment Conservation:

$$\frac{\partial huC_i}{\partial x} + \frac{\partial hvC_i}{\partial y} = E_i - D_i \quad [7]$$

Fluid Conservation:

$$\frac{\partial hu}{\partial x} + \frac{\partial hv}{\partial y} = e_w \sqrt{u^2 + v^2} \qquad [8a]$$

The multiplier term on the right hand side of the fluid conservation Equation 8a is, $$e_w = \frac{0.00153}{0.0204 + F_r^{-2}}, \qquad [8b]$$

and will be recognized to those skilled in the art as an entrainment coefficient often given the symbol $e_w$. Persons skilled in the art will recognize other variations of this term that are also within the scope of this invention. This term is an empirical function of the local Froude number at each point in the flow. The Froude number is, Froude Number:

$$F_r = \sqrt{\frac{u^2 + v^2}{RghC_T}}. \qquad [8c]$$

As indicated, Equations 5 through 8a derive from the Navier-Stokes and continuity principles for a sediment-laden flow beneath stationary clear water. However, certain assumptions are made in using these equations to determine the flow field in the present invention. Persons skilled in the art with the benefit of the disclosures herein will recognize other equations could be used to calculate the flow properties. All such equations are intended to be within the scope of this patent. These assumptions include: 1) that the sediment-laden portion of the flow is assumed to have at each x,y location, a uniform velocity and fixed sediment concentration profile vertically through its thickness, and 2) that the flow field is constant across the entire width of the inlet, as expressed in the following boundary conditions:

Inlet Boundary Conditions:

$$u(0, y) = \begin{cases} u_0 & |y| \le b \\ 0 & |y| > b \end{cases}. \qquad [9a]$$

$$h(0, y) = h_0 |y| \le b \qquad [9b]$$

$$C_i(0, y) = C_{i0} |y| \le b \qquad [9c]$$

As will be understood by those skilled in the art, fluid flow systems are often preferably analyzed using a characteristic curve coordinate system. Such analysis begins with the definition of the characteristic curve relationships, $$\frac{dx}{ds} = hu \qquad [10]$$

$$\frac{dy}{ds} = hv, $$

where s is the characteristic curve parameter.
In this coordinate system,

X-Momentum:

$$\frac{du}{ds} = -\frac{1}{2} Rg \frac{\partial C_T h^2}{\partial x} - u(e_w + c_D)\sqrt{u^2 + v^2}, \qquad [11]$$

Y-Momentum:

$$\frac{dv}{ds} = -\frac{1}{2} Rg \frac{\partial C_T h^2}{\partial y} - v(e_w + c_D)\sqrt{u^2 + v^2}, \qquad [12]$$

Define w as the velocity magnitude so that, $$\frac{dw}{ds} = \frac{1}{w}\left(u\frac{du}{ds} + v\frac{dv}{ds}\right). \qquad [13]$$

Using Equations 11, 12, and 13,

Velocity Magnitude:

$$\frac{dw}{ds} = -\frac{Rg}{2wh} \frac{dC_T h^2}{ds} - w^2(e_w + c_D). \qquad [14]$$

The inlet boundary condition from Equation 9a can be expressed as,

Inlet Boundary Condition:

$$w(0, y) = \begin{cases} w_0 & |y| \le b \\ 0 & |y| > b \end{cases}. \qquad [15]$$

The sediment mass conservation Equation 7 is transformed into the characteristic curve system:

Sediment Mass Conservation:

$$\frac{dC_i}{ds} = (E_i - D_i) - C_i e_w w. \qquad [16]$$

It is sometimes useful to write $C_i$ as the sum of $C_{Ei}$, an equilibrium term for which the deposition and erosion rates exactly cancel, and $C_{Pi}$, the excess sediment volume fraction.

Equilibrium Profile:

$$C_{Ei} = \frac{E_i}{\gamma_0 v_{si}} \qquad [17]$$

Equation 16 for $C_i$ then gives,

Sediment Excess:

$$\frac{dC_{Pi}}{ds} = -(\gamma_0 v_{Si} + e_W w)C_{Pi} - \frac{1}{\gamma_0 v_{Si}}\frac{dE_i}{ds} - \frac{E_i}{\gamma_0 v_{Si}} e_W w \quad [18]$$

The fluid conservation equation along the family of curves indexed by s will be, Fluid Conservation:

$$\frac{dh}{ds} = h e_w w - h^2\left(\frac{\partial u}{\partial x} + \frac{\partial v}{\partial y}\right). \quad [19]$$

The curves indexed by s are not quite characteristic curves of the fluid conservation equation, due to the divergence term that remains in Equation 19. Assume that this term can be written as a function of the variables along the characteristic curves. From this function, the flow properties may be determined throughout the sedimentary body. In this specific case, assume that the function is zero. However, persons skilled in the art with the benefit of the disclosures herein will recognize alternative functions of the variables along the characteristic curves. All such functions are intended to be within the scope of this patent.

$$\left(\frac{\partial u}{\partial x} + \frac{\partial v}{\partial y}\right) = f(s, h, w, C_i) = 0 \quad [20]$$

Under that assumption, Equation 19 can be rewritten as:

Approximate Fluid Conservation:

$$\frac{dh}{ds} = h e_w w \quad [21]$$

Using Equations 1, 16, and 21, the velocity magnitude from Equation 14 becomes,

Approx. Velocity Magnitude:

$$\frac{dw}{ds} = \frac{Rgh}{2}\left(\frac{1-\phi}{T}\frac{z}{w} - C_T e_w\right) - w^2(e_w + c_D). \quad [22]$$

Figure 5:
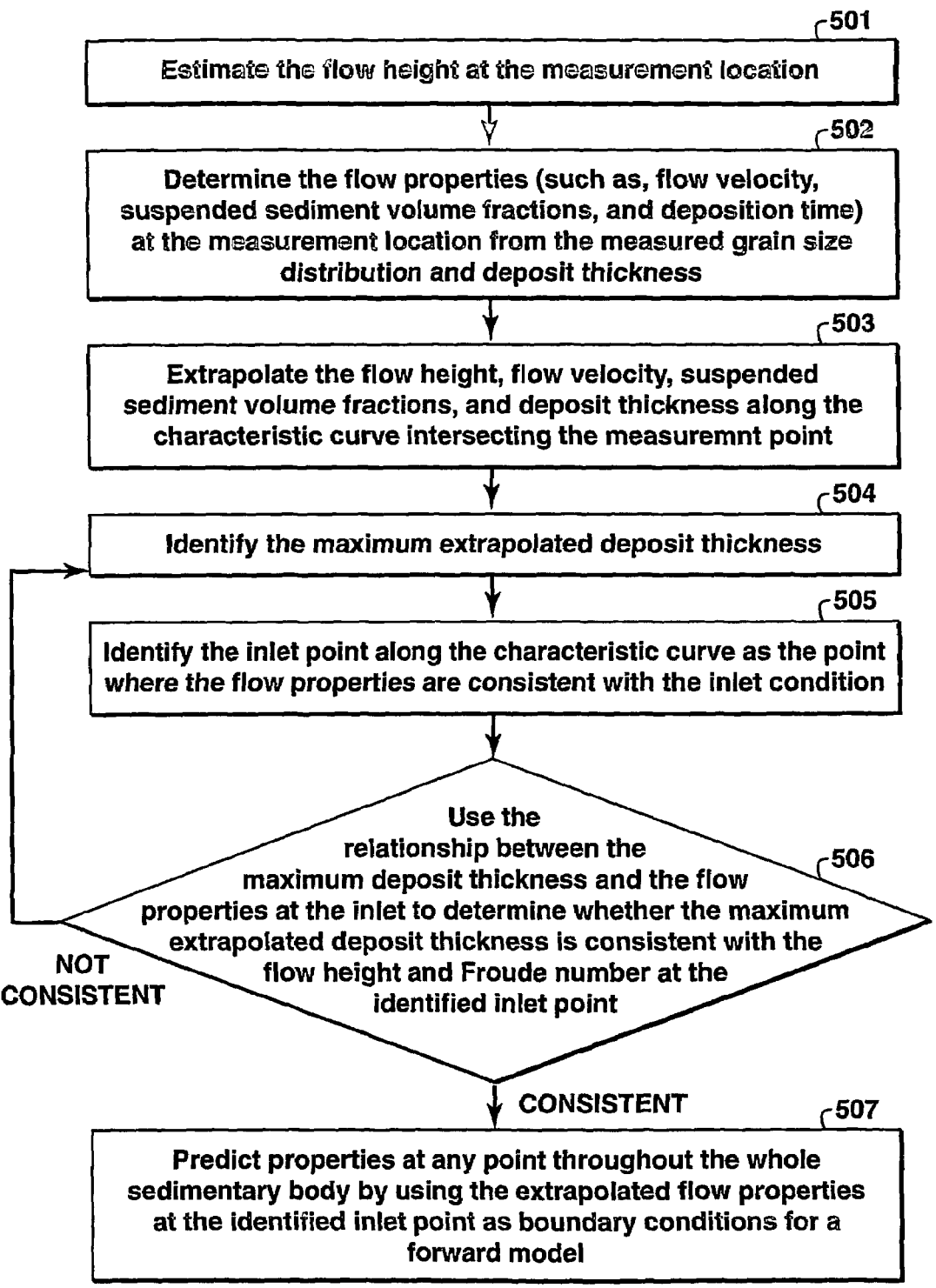
FIG. 5 is a flow chart of a second embodiment of the invention.

A second embodiment of the present invention will now be described. With reference to FIG. 5, this embodiment involves an iterative analysis procedure to establish the flow parameters at the inlet and then forward model the flow from the inlet to establish the full size, shape, and internal properties of the body. First, the flow height at the measurement location is estimated or guessed (step 501). Next, the flow properties (such as flow velocity, suspended sediment volume fractions, and deposition time) are determined at the measurement location from the measured grain size distribution and deposit thickness (step 502). The flow height, flow velocity, suspended sediment volume fractions, and deposit thickness are extrapolated along the characteristic curve (step 503). The maximum extrapolated deposit thickness is identified (step 504). The inlet point is identified as the point where the extrapolated flow height, flow velocity, and suspended sediment volume fractions are consistent with an empirical inlet condition (step 505). The maximum extrapolated deposit thickness and the extrapolated flow properties at the identified inlet point are compared with a theoretical relationship between maximum deposit thickness and inlet flow properties. If the extrapolated values are not consistent with the theoretical relationship, then steps 501-506 are repeated, adjusting the estimate of flow height in step 501 until consistency is achieved (step 506). The extrapolated flow properties at the identified inlet location are used as boundary conditions for a forward model to predict the deposit shape, size, and grain size distribution at any point (step 507). This embodiment will be discussed in more detail in the following paragraphs.

The initial step of this embodiment of the present method of FIG. 5, step 501, is to estimate the flow height at the measurement point. The initial estimate might typically be one meter. The estimate is iteratively refined by: extrapolating the flow field away from the measurement point, checking consistency conditions of the extrapolated results, and updating the flow height estimate until the consistency conditions are met.

In the second step of this embodiment of the present invention, FIG. 5, step 502, the flow field above the measurement point is determined from the deposit thickness and grain size distribution at the measurement point. There are many combinations of flow field properties that would produce the same grain size distribution and deposit thickness at the measurement point. Additional assumptions may be introduced to determine a unique set of flow properties. One such method is described here. Those skilled in the art will understand that other assumptions could be applied to constrain the choice of flow properties. Such other methods for determining the flow field above the measurement point are also within the scope of the invention.

Assume that $C_{Pi}$ is slowly changing so that Equation 18 is equal to zero. Solving for $C_{Pi}$ in Equation 18 then gives, Sediment Excess:

$$C_{Pi} \approx -\frac{1}{\gamma_0 v_{Si}(\gamma_0 v_{Si} + e_W w)}\left(\frac{dE_i}{ds} + E_i e_W w\right). \quad [23]$$

The measured deposit thickness and grain size distribution at the measurement location constrain the choice of flow properties. In terms of $C_{Pi}$, Equation 1 is, Deposit Thickness:

$$z = \frac{T}{(1-\phi)}\sum_i \gamma_0 v_{Si} C_{Pi}, \quad [24]$$

and Equation 2 is,

Grain Size Dist. in Deposit:

$$G_i = \frac{\gamma_0 v_{Si} C_{Pi}}{\sum_i \gamma_0 v_{Si} C_{Pi}}. \quad [25]$$

The grain size distribution $G_i$ gives no information about the grain size fractions in the flow which do not deposit, except that their volume fraction in the flow is less than or equal to the equilibrium volume fraction for that grain size. For this reason, the total volume fraction of non-depositing grains will be combined into the single parameter $C_S$, so that, Total Sediment Volume:

$$C_T = C_S + \sum_{i,G_i \neq 0} \left( \frac{E_i(w)}{\gamma_0 v_{Si}} + C_{Pi} \right), \quad [26]$$

where the summation in Equation 26 is over those grain size bins for which $G_i$ is non-zero.

The unknown properties of the flow at the measurement point are then $C_{Pi}$, w, $C_S$, and $T/(1-\phi)$. The flow height h was fixed in the first step (step 501). These parameters are determined by adjusting w, $C_S$, and $T/(1-\phi)$ until the resulting $C_{Pi}$ from Equation 23 best satisfies the constraints of Equations 24 and 25. Experiments with this embodiment suggest that the depth constraint of Equation 24 be used first to define a one-to-one relationship between w and $T/(1-\phi)$, and then a second constraint such as Equation 25 then be used to select a single pair of w and $T/(1-\phi)$ values from the one-to-one relationship. Persons skilled in the art will recognize that the bedding type observed in the core from which the grain size distribution is measured could alternatively be used to estimate w, providing the second constraint. Persons skilled in the art will further recognize that other methods could be employed to estimate flow velocity from the grain size distribution, providing the second constraint. Such other methods for-determining flow velocity are within the scope of this invention. The value of $T/(1-\phi)$ thus determined is then used along with the measured thickness and grain size distribution to calculate $C_{Pi}$ in the flow from Equations 24 and 25. The value of w thus determined is then used along with the measured grain size distribution to determine $C_{Ei}$ in the flow from Equation 17. Experiments with this embodiment suggest that $C_S$ may typically be ignored and assumed to be zero.

In the third step of the embodiment of the method, FIG. 5, step 503, the flow field and deposit thickness are extrapolated away from the measurement point. Note that Equations 16, 21, and 22 describe the flow along all characteristic curves. The measurement point lies on some characteristic curve. Since the equations are identical on all characteristic curves, it is not necessary to determine which curve the measurement point is on. The measurement location can be arbitrarily assigned the location s=0, and integration proceeds in the negative s direction to move toward the inlet along the characteristic curve and in the positive s direction to move away from the inlet along the characteristic curve. Persons skilled in the art will recognize that the extrapolation along the characteristic curve could also be accomplished by other solution methods, including, but not limited to, control volume methods [Patankar 1980] for solving simultaneously the flow properties at all points along the characteristic curve.

In the fourth step of the embodiment of the method, FIG. 5, step 504, the maximum deposit thickness obtained along the characteristic curve is identified.

In the fifth step of the embodiment of the method, FIG. 5, step 505, the point along the characteristic curve is found where the extrapolated flow field is consistent with a specified inlet condition. The inlet condition is a criterion that allows the location of the inlet to be determined from the extrapolated flow properties along the characteristic curve. For example one suitable inlet condition would be, $$h_0 = a^2 c^3 u_0^2 \quad [27]$$

The corresponding inlet width can also be calculated according to the relationship, $$b = a^2 u_0 \quad [28]$$

Equations 27 and 28 are based on the work of Huang and Nanson (2002) and Huang (1996). The parameters a and c are empirically derived and, as indicated in Huang, typically have the values a=4.33 and c=0.22 $p_{50}^{-0.11}$, where $p_{50}$ is the median grain diameter at the inlet. The estimated inlet location along the characteristic curve is taken to be the point where Equation 27 is satisfied. This relationship was derived for river flows, but analogous relationships can reasonably be applied to the channelized flows in other types of systems. In the alternative, persons skilled in the art, based on the disclosure herein, will recognize other inlet conditions could be utilized. For example, Equation 27 could be replaced by the assumption that along the characteristic curve in the negative-s direction, the deposit thickness will first become zero at the inlet.

In the sixth step of this embodiment of the method, FIG. 5, step 506, the extrapolated maximum deposit thickness obtained in step 504 is checked for consistency with the extrapolated inlet flow conditions obtained in step 505. It is assumed that the maximum thickness of a deposit is the height at which the deposit would divert the flow that created it. In terms of the inlet Froude number, Inlet Froude Number:

$$F_{r0} = \frac{u_0}{\sqrt{Rgh_0 C_{T0}}} \quad [29]$$

the maximum deposit thickness would be, $$z_{max} = qh_0 \left[ \frac{(8F_{r0}^2 + 1)^{3/2} + 1}{16F_{r0}^2} - \frac{1}{4} - \frac{3}{2}F_{r0}^{2/3} \right] \quad [30]$$

Equation 30 derives from the work of Baines (1995). Because Baines' work involved two-dimensional air current flows over obstructions, a scaling constant q has been added to relate the two-dimensional result to the three-dimensional behavior of the hydrodynamic flows of interest. In the present method, scaling constant q is determined from numerical modeling to be 0.9. This value of q depends on the three-dimensional shape and size of the deposit, and the relationship of that shape and size to the flow's assumed characteristics, and may be modified for other flows.

If Equation 30 is not satisfied by the computed maximum deposit thickness and inlet flow conditions, then the estimate of flow height in step 501 is modified, and steps 502 through 506 are repeated until the condition in Equation 30 is satisfied.

In the seventh and final step of this embodiment of the method, FIG. 5, step 507, the inlet conditions calculated when Equation 30 was satisfied are used as boundary conditions for solving Equations 1, 2, 5, 6, 7 and 8 to compute the deposit size, shape, and internal grain size distribution at each point within the deposit. Equations 5, 6, 7, and 8 are flow equations used to predict the properties of sedimentary bodies. Persons skilled in the art will recognize many different methods to solve Equations 5 through 8 (for example, Bradford & Katopodes, 1999). All methods that can be used to solve these flow equations to determine the properties of the deposit are intended to be within the scope of this invention.

TABLE 1

| Parameter | Numeric Reference in Figures | Definition of Parameter |
|---|---|---|
| b | 8 (17 is the inlet) | Half-width of the inlet. The inlet is located at $x = 0$ and y between b and $-b$. |
| $h_0$ | 26 | Height of the turbid water layer at the inlet, constant across the width of the inlet. |
| $u_0$ | | Velocity of the turbid water flow out from the inlet. The flow is assumed to be in the positive x direction, and the velocity is assumed to be constant laterally across the width of the inlet and vertically through the height of the flow. |
| $C_{T0}$ | | Total volume fraction of sediment in the turbid water at the inlet. |
| $h(x, y)$ | 27 | Height of the turbid water layer. |
| $u(x, y)$ | | x-velocity component of the turbid water layer. |
| $v(x, y)$ | | y-velocity component of the turbid water layer. |
| $w(x, y)$ | | Magnitude of the flow velocity. $w = \sqrt{u^2 + v^2}$ |
| T | | Time during which the deposit is built before it diverts the flow. |
| $A(x, y, t)$ | | Time dependent elevation of the subsurface topography. |
| $A(x, y, 0)$ | 24 | Elevation of the subsurface topography before deposition. |
| $A(x, y, T)$ | 30 | Elevation of the subsurface topography after deposition for time period T. |
| $z_{max}$ | | Maximum thickness of the deposit. Equal to $[A(x_m, y_m, T) - A(x_m, y_m, 0)]$, where the subscripts indicate the x, y location of the maximum thickness of the deposit. |
| $C_i(x, y)$ | | Volume fraction of the turbid water layer consisting of sediment in the ith grain size bin, averaged vertically through the turbid water layer. |
| $C_T(x, y)$ | | Total volume fraction of the turbid water layer consisting of sediment. This is the sum of $C_i(x, y)$ over all grain size bins. |
| $G_i(x, y)$ | | Grain size distribution in the deposit, assumed constant through the thickness of the deposit. Sum of $G_i$ over all i is 1. |
| $E_i(x, y)$ | | Erosion rate for the ith grain size bin |
| $D_i(x, y)$ | | Deposition rate for the ith grain size bin |
| $d_i$ | | Grain diameter of the i-th grain size bin |
| $p_{50}(x, y)$ | | Median grain diameter in the deposit at location x, y |
| $v_{si}$ | | Settling velocity of grains of diameter $d_i$ in still water |
| R | | Ratio of the density difference between the sediment and water to the density of water |
| $\phi$ | | Porosity of the deposit. Assumed typically to be 0.4 |
| g | | Gravitational constant, 9.8 m/s² |
| $e_w$ | | Entrainment coefficient. |
| f | | Drag coefficient for erosion, typically 0.002. |
| $c_D$ | | Bottom drag coefficient for flow, typically 0.002. |
| v | | Kinematic viscosity of water. Assumed to be 0.01 cm²/s. |
| s | | Measurement location on the characteristic curve of the flow |
| q | | Scaling constant applied to predicted maximum deposit height, typically 0.9. |
| $F_r$ | | Froude number |
| $R_{pi}$ | | Particle Reynolds dimensionless parameter of flow |
| c | | Empirical coefficient in the inlet condition |
| a | | Empirical coefficient in the inlet condition |
| $z(x, y)$ | 36 | Thickness of deposit resulting from deposition |
| $\gamma_0$ | | Ratio of sediment volume fraction at the bottom of the flow to $C_T$. Used in a correction to the deposition rate which accounts for vertical variation in the sediment concentration. A constant assumed typically to be 2. |

BIBLIOGRAPHY

Baines, Peter G. Topographic Effects in Stratified Flows. New York: Cambridge University Press, 1995.

Bradford, S. F., and Katopodes, N. D., "Hydrodynamics of Turbid Underflows. I: Formulation and Numerical Analysis", J. Hydr. Eng., 125(10), 1006-1015, 1999.

Chaudhry, M. H., Open-Channel Flow. Englewood Cliffs, N.J.: Prentice-Hall, 1993.

Dietrich, W. E., "Settling Velocity of Natural Particles", J. Geophys. Res., 18(6), 1615-1626, 1982.

Garcia, M., and Parker, G., "Entrainment of Bed Sediment into Suspension", J. Hydr. Eng., 117(4), 414-435, 1991.

Huang, H. Q., Discussion: "Alluvial channel geometry: theory and applications" by Julien and Wargadalam. J. Hydr. Eng., 122(12), 750-751, 1996.

Huang, H. Q., and Nanson, G. C., "Hydraulic Geometry and Maximum Flow Efficiency as Products of the Principle of Least Action", Earth Surf. Process. Landforms, 25, 1-16, 2000.

Imran, J., Parker, G., and Katopodes, N. D. "A Numerical Model of Channel Inception on Submarine Fans", J. Geophys. Res., 103(C1), 1219-1238, 1998.

Parker, G., Fukushima, Y., and Pantin, H. M., "Self-Accelerating Turbidity Currents", J. Fluid Mech., 171, 145-181, 1986.

Patankar, S. V., Numerical Heat Transfer and Fluid Flow. New York: Hemisphere Publishing, 1980.

We claim:

1. A method to determine properties of a water-lain sediment body from a measurement of grain size distribution and deposit thickness at one location in the body, comprising:
   (a) determining the flow properties at the measured location;
   (b) extrapolating the flow properties back to the inlet through which the depositing flow was emitted;
   (c) determining at least one property of the water-lain sediment throughout the sediment body by modeling the flow properties using the extrapolated flow properties at the inlet from step (b) as a boundary condition.

2. The method of claim 1 wherein the properties of a water-lain sediment body are selected from the group comprising thickness of the body, size of the body, shape of the body, grain size distribution of the body, flow velocity above the body, suspended sediment volume fractions above the body, deposition time, flow height above the body, inlet flow conditions and any combination thereof.

3. The method of claim 1 wherein the flow properties are selected from the group comprising flow velocity, suspended sediment volume fractions, deposition time, flow height and any combination thereof.

4. The method of claim 1 wherein an iterative process is used to determine the flow properties at the inlet.

5. The method of claim 4 further comprising using a relationship between inlet flow properties and maximum deposit height to determine when the correct inlet flow properties have been found in the iterative process.

6. The method of claim 4 wherein relationships between inlet flow properties is used to determine when the extrapolation of the flow properties has reached the inlet.

7. The method of claim 1 wherein the flow properties at the measurement location are determined based on a relationship of the suspended sediment volume fractions in the flow for each grain size to other flow properties.

8. The method of claim 1 wherein the extrapolation of flow properties is accomplished by utilizing characteristic curves of equations describing the flow.

9. The method of claim 1 wherein at least one property of the sedimentary body is predicted using the Froude number at the inlet as an indicator of at least one property of the sedimentary body.

10. The method of claim 1 wherein at least one property of the sedimentary body is predicted by using a non-dimensional parameter wherein the non-dimensional parameter is a function of the Froude number.

11. The method of claim 1 wherein a property of the sand body is predicted by modeling, using the flow conditions at the inlet as a boundary condition.

12. A method to determine properties of a water-lain sediment body throughout the body from a measurement of grain size distribution and deposit thickness at one location in the body, comprising:
   (a) estimating the flow height at the measured location;
   (b) determining the flow properties at the measured location from the grain size distribution and deposit thickness at the measured location;
   (c) extrapolating the flow properties along a characteristic curve intersecting the measurement point;
   (d) identifying the maximum extrapolated deposit thickness;
   (e) identifying the inlet point along the characteristic curve as the point where the flow properties are consistent with the inlet conditions;
   (f) repeating steps (a) through (e) until the relationship between the maximum deposit thickness and the flow properties at the inlet is consistent with the flow height and Froude number at the identified inlet point;
   (g) predicting at least one property of the water-lain sediment body throughout the body by using the extrapolated flow properties at the inlet point as a boundary condition for a forward model.

13. The method of claim 12 wherein the flow properties are selected from the group comprising flow velocity, suspended sediment volume fractions, deposition time, flow height, and any combination thereof.

14. The method of claim 12 wherein the properties of a water-lain sediment body are selected from the group comprising thickness of the body, size of the body, shape of the body, grain size distribution of the body, flow velocity above the body, suspended sediment volume fractions above the body, deposition time, flow height above the body, inlet flow conditions, and any combination thereof.

* * * * *